United States Patent
Watarai

(10) Patent No.: US 8,756,814 B2
(45) Date of Patent: Jun. 24, 2014

(54) METHOD OF MANUFACTURING A BICYCLE RIM

(75) Inventor: Etsuyoshi Watarai, Osaka (JP)

(73) Assignee: Shimano Inc., Osaka (JP)

( * ) Notice: Subject to any disclaimer, the term of this patent is extended or adjusted under 35 U.S.C. 154(b) by 454 days.

(21) Appl. No.: 13/018,750

(22) Filed: Feb. 1, 2011

(65) Prior Publication Data

US 2012/0193971 A1    Aug. 2, 2012

(51) Int. Cl.
*B21K 1/38* (2006.01)
*B60B 25/00* (2006.01)

(52) U.S. Cl.
USPC .............. 29/894.354; 29/894.351; 29/894.35; 301/95.102; 301/95.11

(58) Field of Classification Search
USPC ......... 29/894.35, 894.351, 894.352, 894.353, 29/894.354; 301/95.11, 95.101, 95.102, 301/95.104, 95.105, 95.106, 95.109, 99
See application file for complete search history.

(56) References Cited

U.S. PATENT DOCUMENTS

| | | | | | |
|---|---|---|---|---|---|
| 2,080,866 | A | * | 5/1937 | Lobdell, Jr. | 29/894.353 |
| 3,083,751 | A | * | 4/1963 | Todoran et al. | 72/12.5 |
| 4,054,982 | A | * | 10/1977 | Damman | 29/894.35 |
| 4,266,417 | A | * | 5/1981 | Imamura et al. | 72/168 |
| 4,669,291 | A | * | 6/1987 | Asari et al. | 72/83 |
| 5,975,645 | A | | 11/1999 | Sargent | |
| 6,991,298 | B2 | | 1/2006 | Ording et al. | |
| 2011/0006590 | A1 | * | 1/2011 | Lo | 301/95.11 |

FOREIGN PATENT DOCUMENTS

| | | |
|---|---|---|
| CN | 1826217 A | 8/2006 |
| DE | 20 2006 009 707 U1 | 11/2006 |
| DE | 20 2010 002 950 U1 | 6/2010 |
| JP | 05-115935 A | 5/1993 |
| JP | 2006-096336 | 4/2006 |
| JP | 3892761 B2 | 3/2007 |
| JP | 2010-149182 A | 7/2010 |
| TW | I294833 | 3/2008 |
| TW | 201102283 A | 1/2011 |

\* cited by examiner

*Primary Examiner* — Sarang Afzali
(74) *Attorney, Agent, or Firm* — Global IP Counselors

(57) ABSTRACT

A bicycle rim is basically provided with an outer rim portion and an inner rim portion. The outer rim portion has a ring shape of a first material. The inner rim portion is joined to the outer rim portion. The inner rim portion has a ring shape of a second material with an internal residual stress distribution resulting from the ring shape being formed by spinning of the second material.

5 Claims, 11 Drawing Sheets

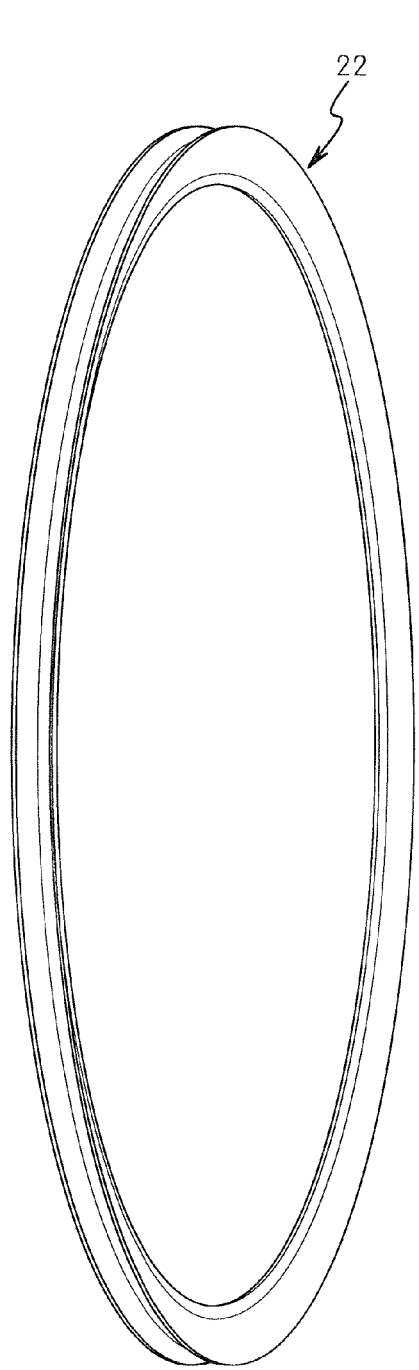
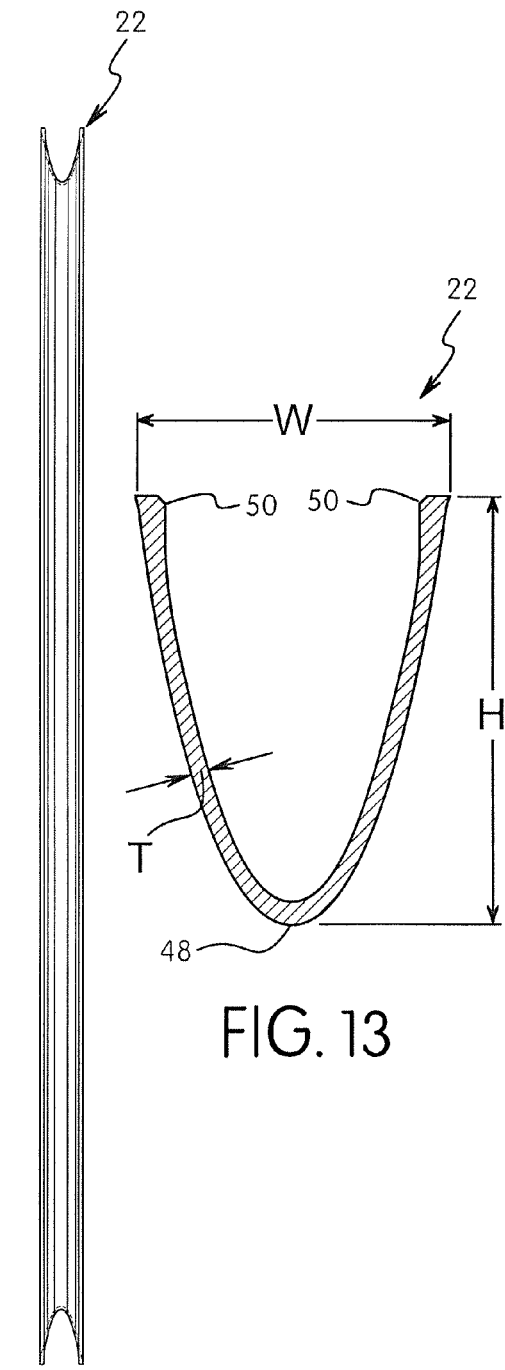
FIG. 11   FIG. 12   FIG. 13

METHOD OF MANUFACTURING A BICYCLE RIM

BACKGROUND

1. Field of the Invention

This invention generally relates to a bicycle rim. More specifically, the present invention relates to a bicycle rim for tensioned spokes.

2. Background Information

Bicycle wheels are continually undergoing design modifications to make them easier to manufacture and assemble, as well as stronger, lighter and more aerodynamic. Various types of bicycle wheels are being sold on the market at present. Most bicycle wheels include a hub, a plurality of spokes and an annular rim. The hub is rotatably mounted to a part of the bicycle frame. The inner end of each spoke is connected to the hub and the spokes extend outward from the hub. The annular rim is connected to the outer ends of the spokes and includes an outer circumferential part that supports a pneumatic tire.

In the mid 1990's, bicycle manufacturer began producing aerodynamic bicycle wheels with a deep cross sectional profile that has a high aspect ratio (i.e., a large rim height relative to the rim width). Some of these aerodynamic bicycle wheels were manufactured by extruding a metal material into a tubular metal member with the desired deep cross sectional profile. Then, the tubular metal member is rounded into a hoop and the ends are butt welded together. During this conventional process, special technical skill is needed to produce a rim with a high aspect ratio from an extruded tubular metal member.

SUMMARY

One aspect is to provide a bicycle rim with a deep cross sectional profile and a high aspect ratio that is relatively simple to manufacture.

In view of the state of the known technology, a bicycle rim is provided that basically comprises an outer rim portion and an inner rim portion. The outer rim portion has a ring shape of a first material. The inner rim portion is joined to the outer rim portion. The inner rim portion has a ring shape of a second material with an internal residual stress distribution resulting from the ring shape being formed by spinning of the second material.

In carrying out the above mentioned aspect a method of manufacture a bicycle rim is provided that basically comprises forming an outer rim portion having a ring shape from a first material, forming an inner rim portion having a ring shape from a second material by spinning of the second material, and joining the outer and inner rim portions together.

These and other objects, features, aspects and advantages of the bicycle rim present disclosure will become apparent to those skilled in the art from the following detailed description, which, taken in conjunction with the annexed drawings, discloses illustrated embodiments.

BRIEF DESCRIPTION OF THE DRAWINGS

Referring now to the attached drawings which form a part of this original disclosure:

FIG. 11 is a perspective view of the seamless inner rim portion after the spinning operation of FIGS. 9 and 10 has been performed on the seamless cylindrical ring in accordance with the first manufacturing process;

FIG. 12 is an edge elevational view of the inner rim portion after the spinning operation of FIGS. 9 and 10 has been performed on the seamless cylindrical ring in accordance with the first manufacturing process;

FIG. 13 is an enlarged cross sectional view of the inner rim portion after the spinning operation of FIGS. 9 and 10 has been performed on the seamless cylindrical ring in accordance with the first manufacturing process;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
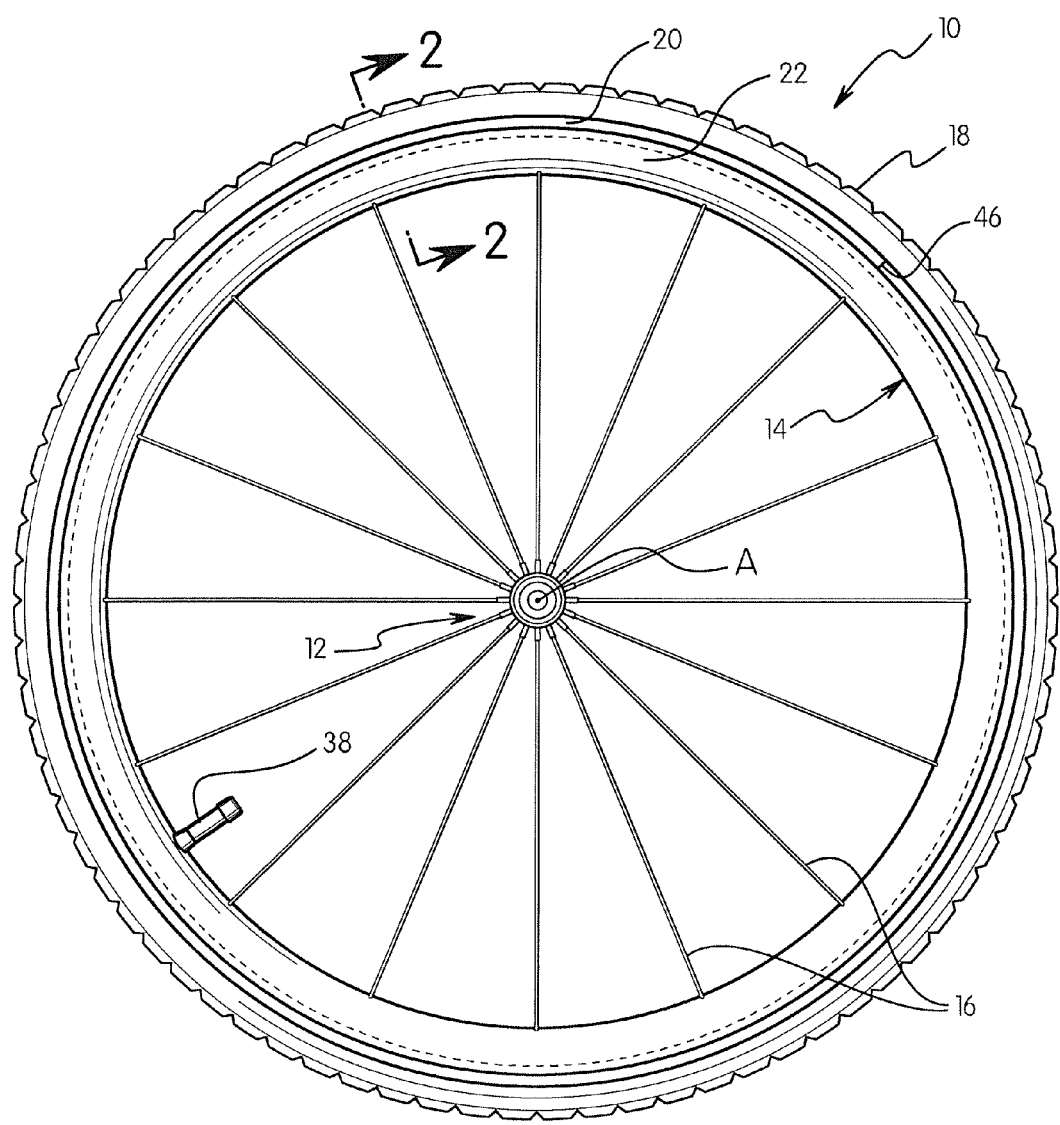
FIG. 1 is a side elevational view of a front bicycle wheel that includes a bicycle rim in accordance with a first illustrated embodiment.
Figure 2:
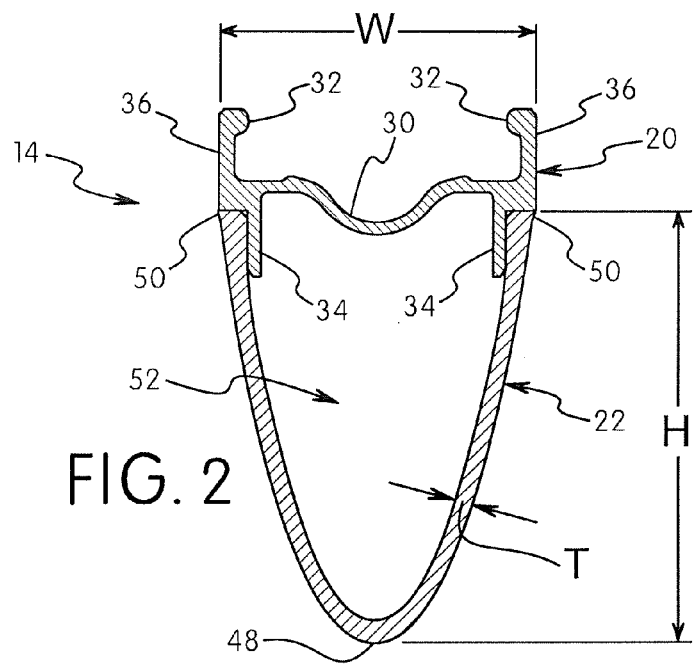
FIG. 2 is an enlarged cross sectional view of a portion of a rim of the bicycle wheel illustrated in FIG. 1 as seen along section line 2-2 in FIG. 1.

Referring initially to FIGS. 1 and 2, a tensioned spoke bicycle wheel 10 is illustrated in accordance with one illustrated embodiment. The bicycle wheel 10 basically includes a center hub 12, a bicycle rim 14, a plurality of spokes 16 and a pneumatic tire 18. The hub 12 connected to the rim 14 by the spokes 16, which are placed under tension. The axle of the hub 12 defines a center rotational axis A of the bicycle wheel 10 such that the rim 14 rotates about the center rotational axis A in a conventional manner. The tire 18 is attached to the outer periphery of the rim 14. The hub 12, the spokes 16 and the tire 18 are conventional parts, and thus, the hub 12, the spokes 16 and the tire 18 will only be briefly explained herein. The bicycle wheel 10 is a clincher tire wheel in which that an air tight chamber is formed between the outer surface of the rim 14 and a pneumatic tire 18. Of course, it will be apparent to those skilled in the art from this disclosure that the rim 14 can be adapted to a tubeless tire wheel as needed and/or desired.

As seen in FIG. 2, the rim 14 basically includes an outer rim portion 20 made from a first material and an inner rim portion 22 made from a second material. As mentioned below, the first and second materials of the outer and inner rim portions 20 and 22 are preferably both metallic materials. The outer and inner rim portions 20 and 22 are separate members that are joined together to form an integrated bicycle rim. The outer rim portion 20 can be joined or bolded to the inner rim portion 22 in a variety of ways. For example, the outer rim portion 20 can be bonded to the inner rim portion 22 by welding. Alternatively, for example, the outer rim portion 20 can be bonded to the inner rim portion 22 by an adhesive. Since the outer and inner rim portions 20 and 22 are separate members, which are joined together as a unit, the rim 14 can be reliably manufactures with a deep cross sectional profile having a high aspect ratio.

Referring to FIG. 2, the outer rim portion 20 of the rim 14 will now be explained in more detail. In the illustrated embodiment, the outer rim portion 20 includes an annular outer bridge 30, a pair of annular bead hooks or flanges 32 and a pair of annular attachment flanges 34. The annular outer bridge 30, the annular bead flanges 32 and the annular attachment flanges 34 are integrally formed as a one-piece, unitary member. The exterior surfaces of the annular bead flanges 32 form a pair of brake contact surfaces 36. The brake contact surfaces 36 are continuous flat surfaces. The brake contact surfaces 36 are typically formed by grinding the sides of the rim 14 after butt welding the ends of the outer rim portion 20 together to form a hoop.

The tire 18 is attached to the outer periphery of the rim 14 by the bead flanges 32 in a conventional manner. Of course, it will be apparent to those skilled in the art from this disclosure that the annular outer bridge 30, the annular bead flanges 32 can be configured to accommodate a tubeless tire as needed and/or desired. The annular outer bridge 30 can be free of any openings communicating with the interior space except for a single air valve mounting opening, which is used to mount an air valve 38 (see, FIG. 1) in a conventional manner. Alternatively, the annular outer bridge 30 can include openings for accessing and or mounting the spokes 16 as needed and/or desired.

The outer rim portion 20 is essentially a circular metal member or ring shaped member in its final form as seen in FIG. 1. In the illustrated embodiment, the outer rim portion 20 is a metal ring or hoop formed of a suitable metallic material such as an aluminum alloy. As discussed below, for example, the outer rim portion 20 is preferably formed by extruding metal into an elongated metal member 40 (see, FIG. 3) with a desired uniform cross sectional profile suitable for the rim 14. The elongated metal member 40 is then cut (see, FIG. 4) to the desired length and bent into a hoop (see, FIGS. 5 and 6) using a plurality of opposed rollers 42 and 44 such that the metal member 40 becomes the outer rim portion 20 with a pair of the first and second circumferential ends 20a and 20b. Typically, the first and second circumferential ends 20a and 20b of the outer rim portion 20 are joined together by welding or pinning. The point where the first and second circumferential ends 20a and 20b of the outer rim portion 20 are joined together defines an outer rim joint 46. During the grinding process to form the brake contact surfaces 36, any excess material of the outer rim joint 46 is removed, if the first and second circumferential ends 20a and 20b of the outer rim portion 20 are joined together by welding. Thus, in its final form, the outer rim portion 20 has a ring shape. The term "ring shape" as used herein includes both an absolute cylindrical ring without any gap and an incomplete cylindrical ring which has its circumferential ends separate by a gap therebetween. In other words, the first and second circumferential ends 20a and 20b of the outer rim portion 20 are not necessarily joined together. Rather, the first and second circumferential ends 20a and 20b can be held in an abutting relationship upon join the outer and inner rim portions 20 and 22 together.

Again referring to FIG. 2, the inner rim portion 22 of the rim 14 will now be explained in more detail. In its final form, the inner rim portion 22 has a ring shape. Basically, the inner rim portion 22 has an arch shaped cross sectional profile (e.g., a generally V-shape or a generally U-shaped) with an apex 48 and a pair of outer attachment ends 50. Of course, the arch shaped cross sectional profile of the inner rim portion 22 can have a wide range of geometry, which can be optimized for particular performance goals as needed and/or desired. Aerodynamics, mass and inertia, stiffness, durability, and cost are all considerations in the exact shape of the arch shaped cross sectional profile of the inner rim portion 22.

The outer attachment ends 50 of the inner rim portion 22 are fixedly secured to the annular attachment flanges 34 of the outer rim portion 20. In the illustrated embodiment, the outer attachment ends 50 of the inner rim portion 22 overlies outwardly facing surfaces of the annular attachment flanges 34 of the outer rim portion 20 in an overlapping manner around the entire circumference of the rim 14. After joining the outer and inner rim portions 20 and 22 together, the outer and inner rim portions 20 and 22 define an interior space 52.

In the illustrated embodiment, the inner rim portion 22 is a one-piece, unitary member formed of a suitable material that can be deformed by spinning as discussed below. For example, the inner rim portion 22 can be made of a suitable metal alloy such as an aluminum alloy. Since the outer and inner rim portions 20 and 22 are formed as separate members, the inner rim portion 22 can be formed of a different from the outer rim portion 20 as needed and/or desired. Alternatively, the outer and inner rim portions 20 and 22 can be formed of the same type of material as needed and/or desired.

After spinning a plate or a cylindrical ring (a starting material) that forms the inner rim portion 22, the inner rim portion 22 has a wall thickness T that is equal to or less than one millimeter. Preferably, the wall thickness T of the inner rim portion 22 lies in a range from 0.2 millimeter to 1.0 millimeter. More preferably, the wall thickness T of the inner rim portion 22 is 0.4 millimeter. Also the cross sectional profile of the inner rim portion 22 has a maximum height H that is equal to or greater than thirty-five millimeter. The maximum height H is measured in a radial direction with respect to a center axis of the bicycle rim. Preferably, the maximum height H lies in a range from thirty-five millimeters to one hundred millimeters. More preferably, the maximum height H is seventy millimeters. As explained below, the inner rim portion 22 has an internal residual stress distribution that results from a plate or a cylindrical ring (a starting material) being deformed by spinning to produce the inner rim portion 22 with an arch shaped cross sectional profile (e.g., a generally V-shape or a generally U-shaped).

The inner rim portion 22 is provided with an air valve mounting opening (not shown) for mounting the air valve 38 and a plurality of spoke openings (not shown) that corresponds to the number of the spokes 16. Since the configurations and arrangements of the valve mounting opening and the spoke openings for a rim are well known and vary depending on the purpose of the rim, the configurations and arrangements of the valve mounting opening and the spoke openings will not be discussed and/or illustrated herein.

Figure 3:
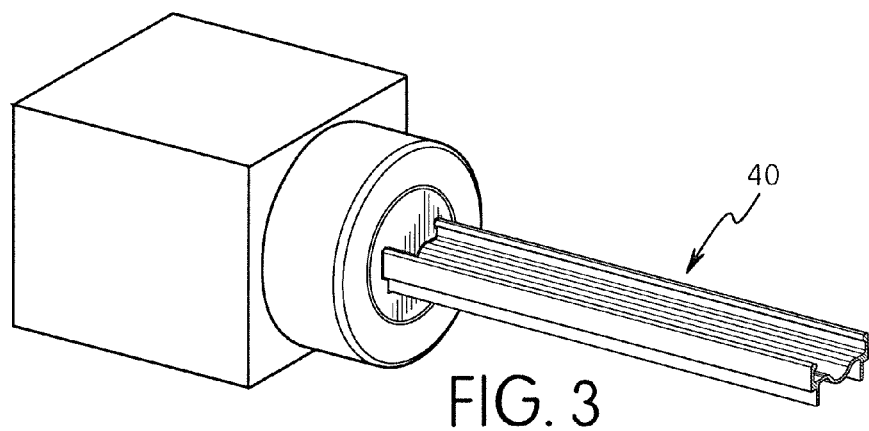
FIG. 3 is a diagrammatic view of an outer rim portion being extruded for manufacturing the bicycle rim of the bicycle wheel illustrated in FIG. 1.
Figure 4:
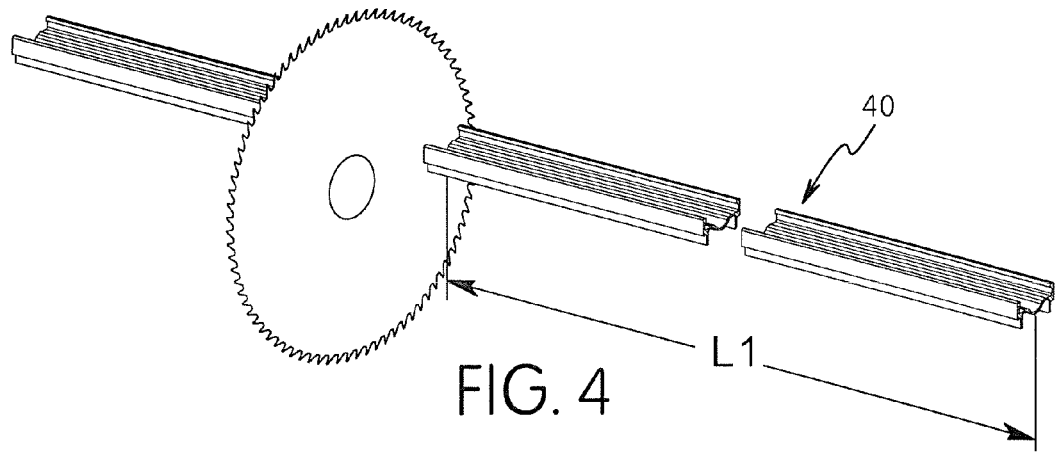
FIG. 4 is a diagrammatic view of the outer rim portion illustrated in FIG. 3 being cut to a desired predetermined length for manufacturing the bicycle rim of the bicycle wheel illustrated in FIG. 1.
Figure 5:
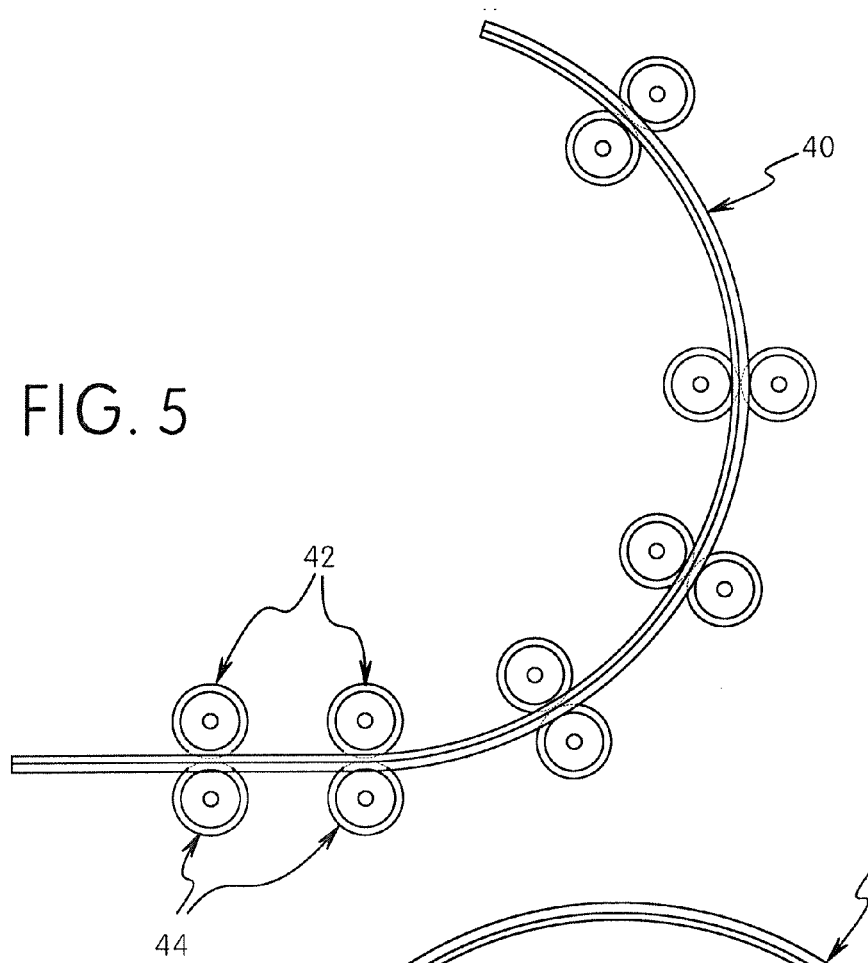
FIG. 5 is a diagrammatic view of the outer rim portion that was formed as illustrated in FIGS. 3 and 4 being bent to form a hoop.
Figure 6:
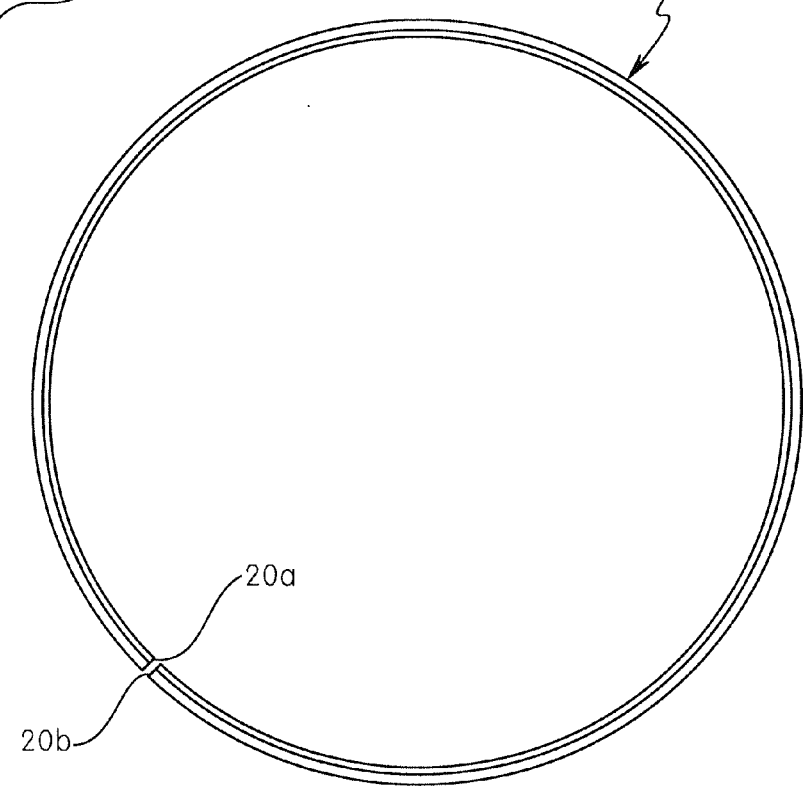
FIG. 6 is a side elevational view of the outer rim portion that was formed as illustrated in FIGS. 3 to 5 after being bent into a hoop.

Referring now to FIGS. 3 to 6, a process of manufacturing the outer rim portion 20 of the rim 14 for the bicycle wheel 10 of FIG. 1 will now be discussed. Initially, the first material for the outer rim portion 20 is selected based on the type of wheel being manufactured. For example, the first material for the outer rim portion 20 can be an aluminum alloy. The first material is then extruded into the elongated metal member 40 with the basic overall shape of the outer rim portion 20 as seen in FIG. 3. Next, the elongated metal member 40 is cut to a desired predetermined length L1 for manufacturing the rim 14 of a desired diameter as seen in FIG. 4. Then the elongated metal member 40 is bent or rounded to form a hoop as seen in FIG. 5. After rounding the elongated metal member 40, the outer rim portion 20 of the rim 14 is formed in a ring shape from the elongated metal member 40, as seen in FIG. 6. Thus, basically, in this process of manufacturing the outer rim portion 20 of the rim 14, the forming of the outer rim portion 20 includes extruding the elongated metal member 40 and then subsequently rounding the elongated metal member 40 (the first material) to form a hoop that constitutes the outer rim portion 20.

Depending on the method of manufacturing the inner rim portion 22, the outer rim portion 20 is either now ready to be installed on the inner rim portion 22, or the circumferential ends 20a and 20b of the outer rim portion 20 is joined together and then installed on the inner rim portion 22. Also depending on the method of joining the outer and inner rim portions 20 and 22 together, the circumferential ends 20a and 20b of the outer rim portion 20 may not be physically joined, but rather merely held next to each other.

Figure 7:
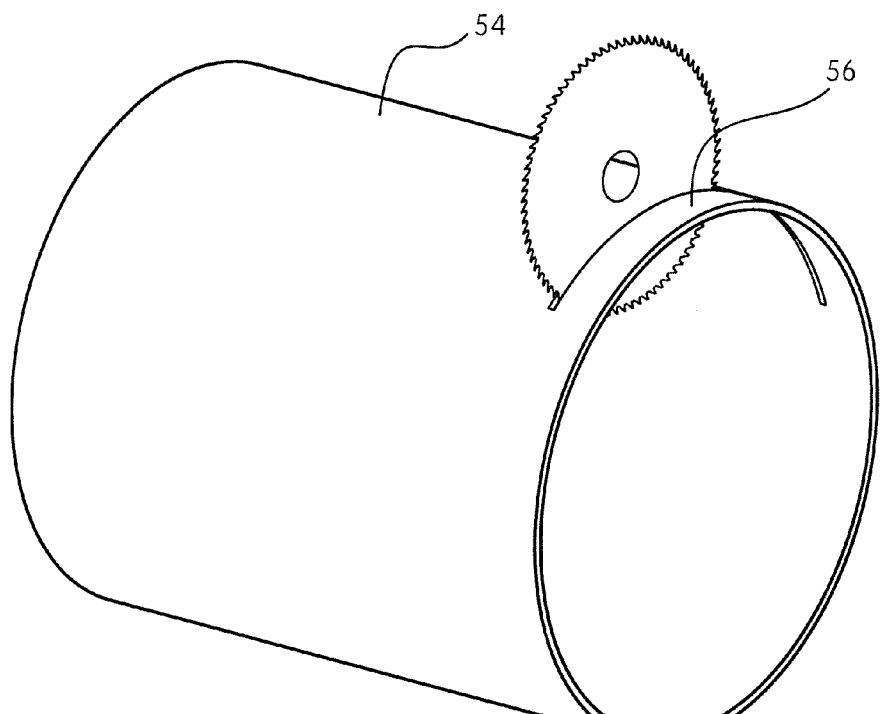
FIG. 7 is a diagrammatic view of a seamless hoop or seamless cylindrical ring being formed by cutting a cylindrical pipe for manufacturing an inner rim portion in accordance with a first manufacturing process.
Figure 17:
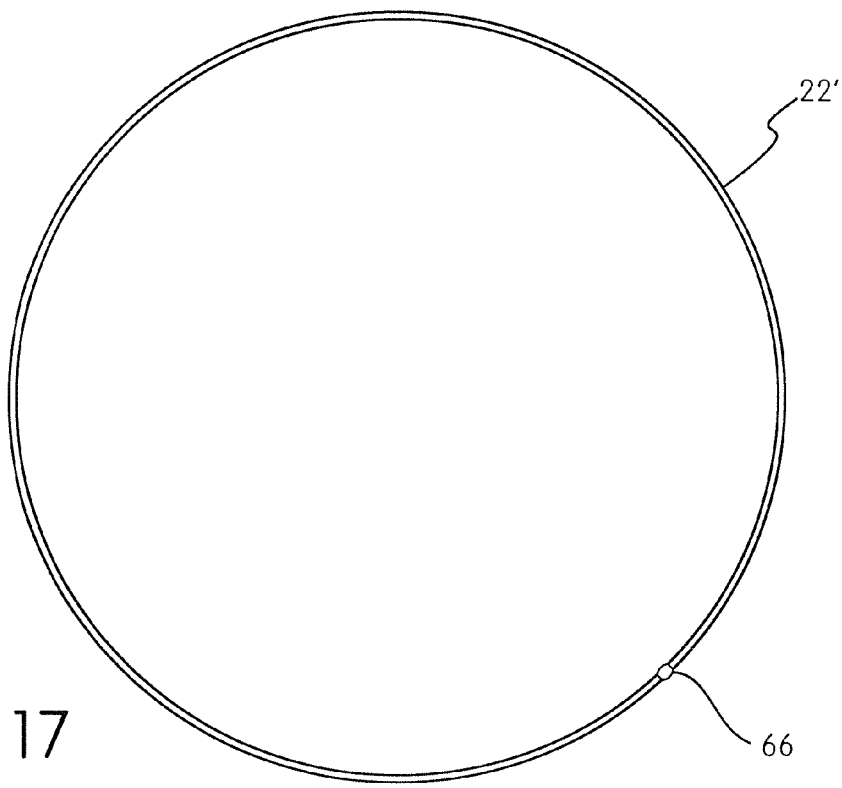
FIG. 17 is a diagrammatic perspective view of the cylindrical ring that was formed in FIGS. 14 and 15, after the first and second circumferential ends of the cylindrical ring have been welded together in accordance with the second manufacturing process.

Referring now to FIGS. 7 to 13, a first process of manufacturing the inner rim portion 22 of the rim 14 for the bicycle wheel 10 of FIG. 1 will now be discussed. In this first process of manufacturing the inner rim portion 22, as seen in FIG. 7, a cylindrical pipe 54 is used as the second material for the inner rim portion 22. The diameter of the cylindrical pipe 54 is selected based on the desired diameter of the rim 14 being manufactured. The type of material for the cylindrical pipe 54 is also selected based on the type of wheel being manufactured. By using a pipe, the inner rim portion 22 can be made as a seamless member. In this embodiment, the cylindrical pipe 54 is a seamless pipe. However the cylindrical pipe 54 can be made from a non-seamless pipe if needed and/or desired. For example, a large plate can be rounded and then its longitudinal edges can be joined (e.g., welded) to form a non-seamless pipe. In this case the cylindrical pipe 54 is not seamless pipe, and when the pipe is cut, the cylindrical ring 56 will be the same as shown in FIG. 17, which is discussed below.

Figure 8:
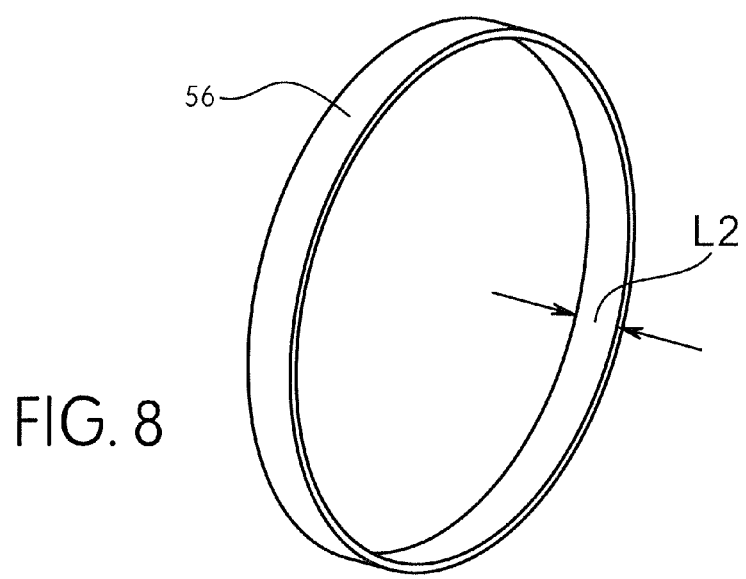
FIG. 8 is a perspective view of the seamless cylindrical ring formed in FIG. 7 for manufacturing the inner rim portion in accordance with the first manufacturing process.
Figure 9:
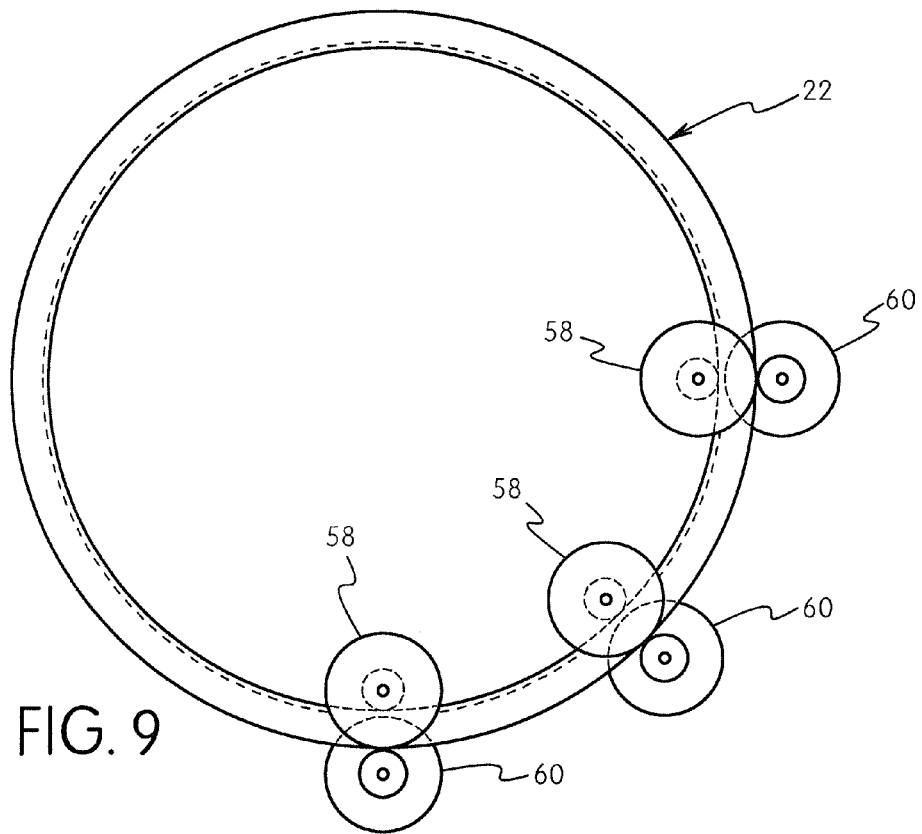
FIG. 9 is a diagrammatic view of the seamless cylindrical ring illustrated in FIG. 8 being treated to form an arch shaped cross sectional profile by spinning the seamless cylindrical ring using a plurality of opposed rollers in accordance with the first manufacturing process.
Figure 10:
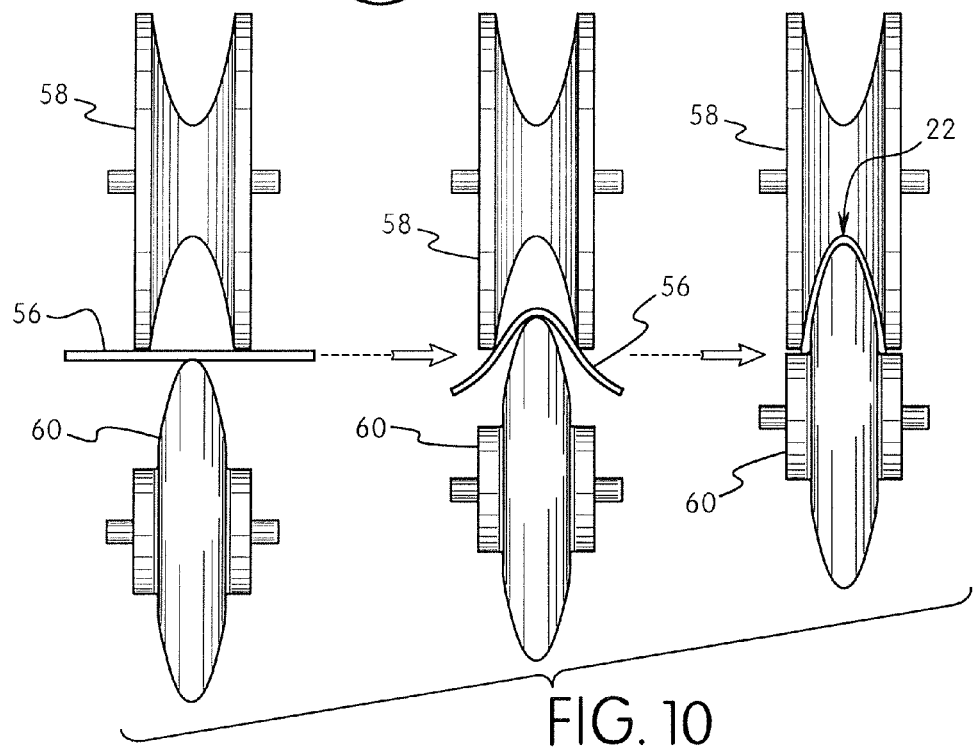
FIG. 10 is a diagrammatic view of two of the opposed rollers used during spinning of the seamless cylindrical ring with the opposed rollers moving gradually closer together to form an arch shaped cross sectional profile in accordance with the first manufacturing process.

As seen in FIG. 8, the cylindrical pipe 54 is cut to a desired predetermined length L2 to form a seamless cylindrical ring 56. Now, the seamless cylindrical ring 56 is deformed using a plurality of opposed rollers 58 and 60 as seen in FIGS. 9 and 10. The rollers 58 and 60 are gradually moved towards each other while spinning the seamless cylindrical ring 56 to form the inner rim portion 22 with the arch shaped cross sectional profile as seen in FIGS. 11 to 13.

Thus, basically, in this first process of manufacturing the inner rim portion 22 of the rim 14, the forming of the inner rim portion 22 includes cutting the cylindrical pipe 54 that constitutes the second material to form a cylindrical ring 56 prior to performing a spinning operation using the opposed rollers 58 and 60.

Figure 14:
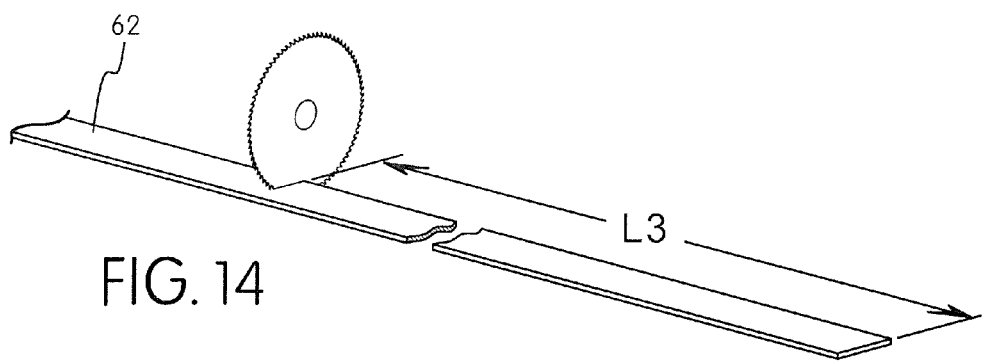
FIG. 14 is a diagrammatic view of a plate being cut to a desired predetermined length for manufacturing the inner rim portion in accordance with a second manufacturing process.

Referring now to FIGS. 14 to 18, a second process of manufacturing an inner rim portion 22' of the rim 14 for the bicycle wheel 10 of FIG. 1 will now be discussed. The inner rim portion 22' is identical to the inner rim portion 22, discussed above, except that the inner rim portion 22' is not a seamless ring as discussed below. In this second process of manufacturing the inner rim portion 22', as seen in FIG. 13, a plate 62 is used as the second material for the inner rim portion 22'. The plate 62 is cut to a desired predetermined length L3 based on the desired diameter of the rim 14 being manufactured as seen in FIG. 14. The type of material for the plate 62 is also selected based on the type of wheel being manufactured.

Figure 15:
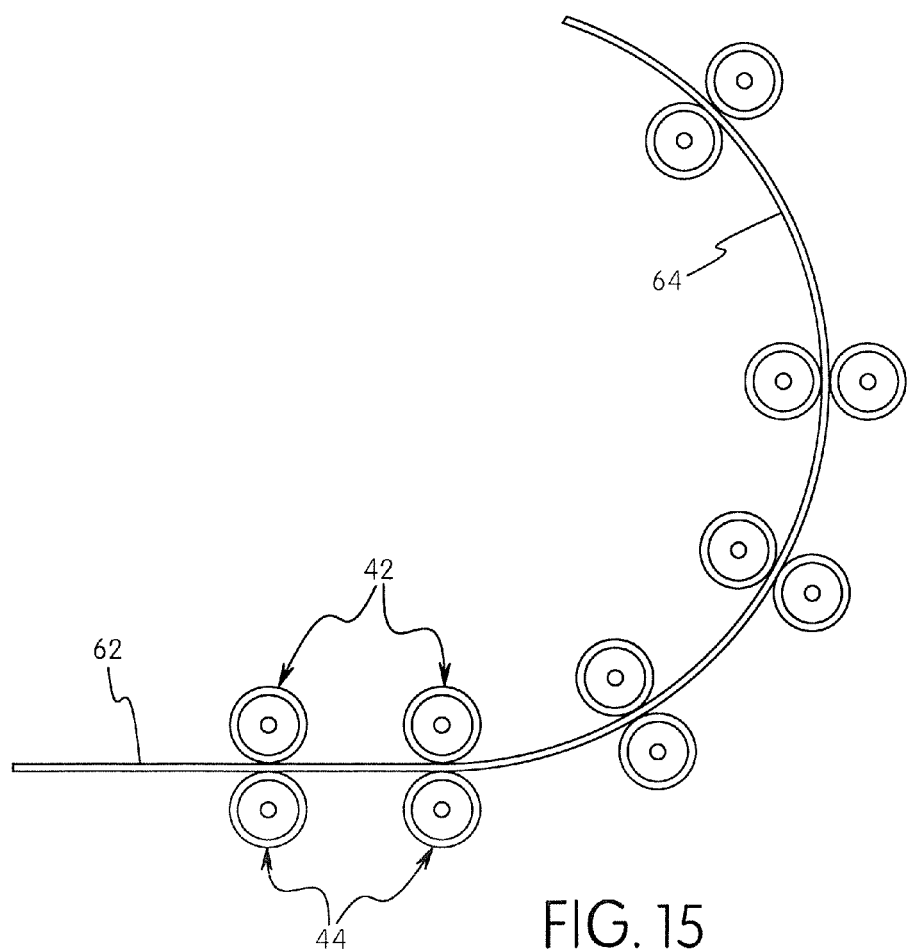
FIG. 15 is a diagrammatic view of the plate illustrated in FIG. 14 being bent to form a hoop or cylindrical ring for manufacturing the inner rim portion in accordance with the second manufacturing process.
Figure 16:
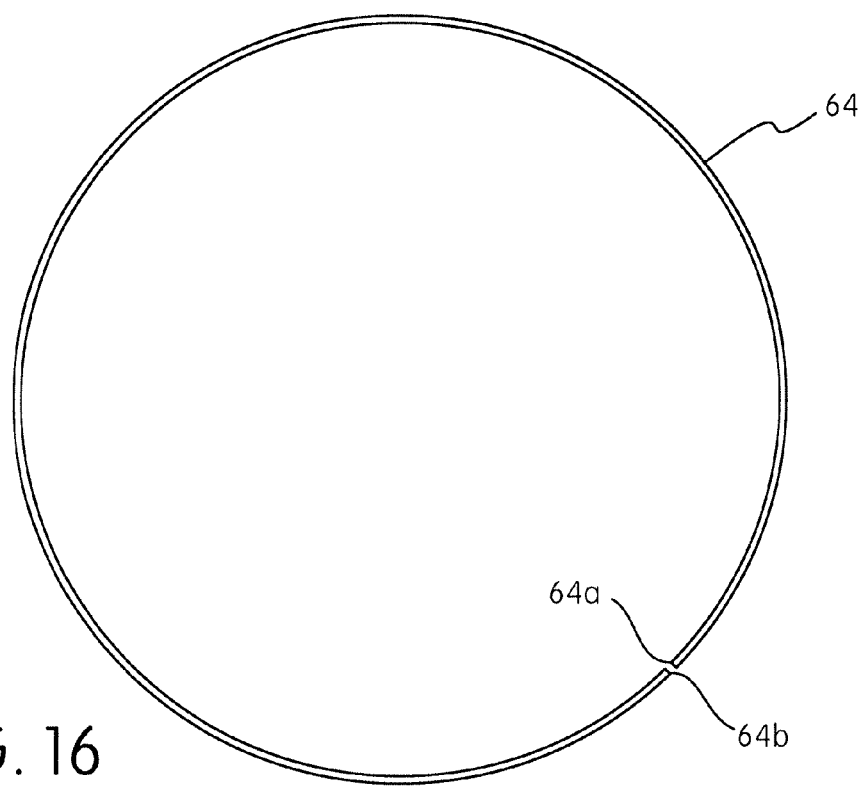
FIG. 16 is an elevational view of the split cylindrical ring formed in FIG. 15 for manufacturing the inner rim portion in accordance with the second manufacturing process.
Figure 18:
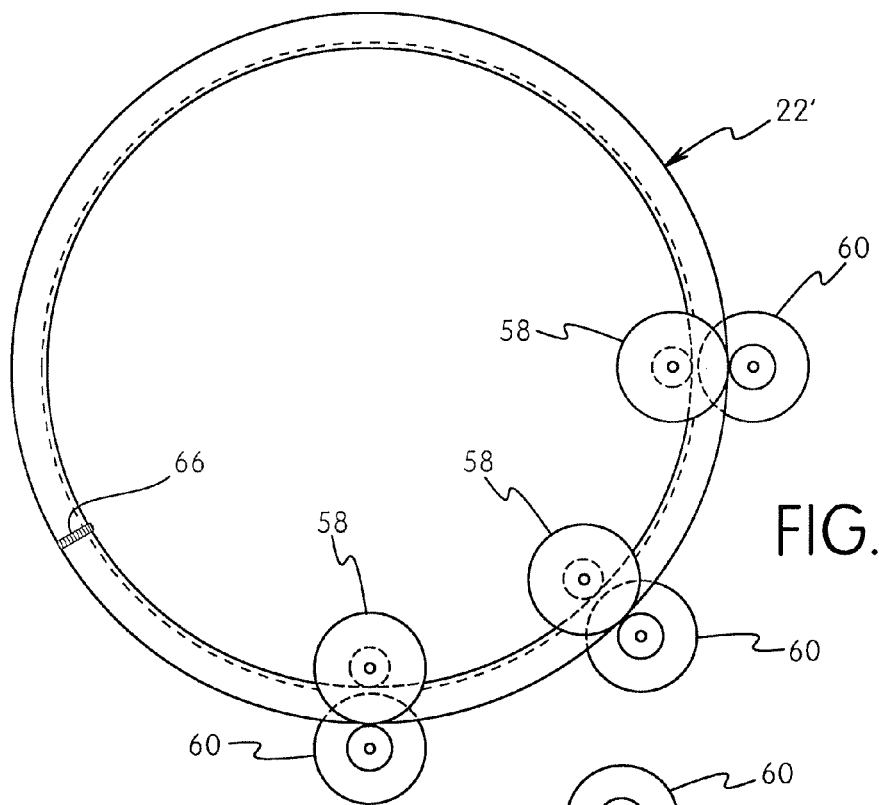
FIG. 18 is a diagrammatic view of the cylindrical ring illustrated in FIG. 17 being deformed to form an arch shaped cross sectional profile by spinning the cylindrical ring using a plurality of opposed rollers in accordance with the second manufacturing process.
Figure 21:
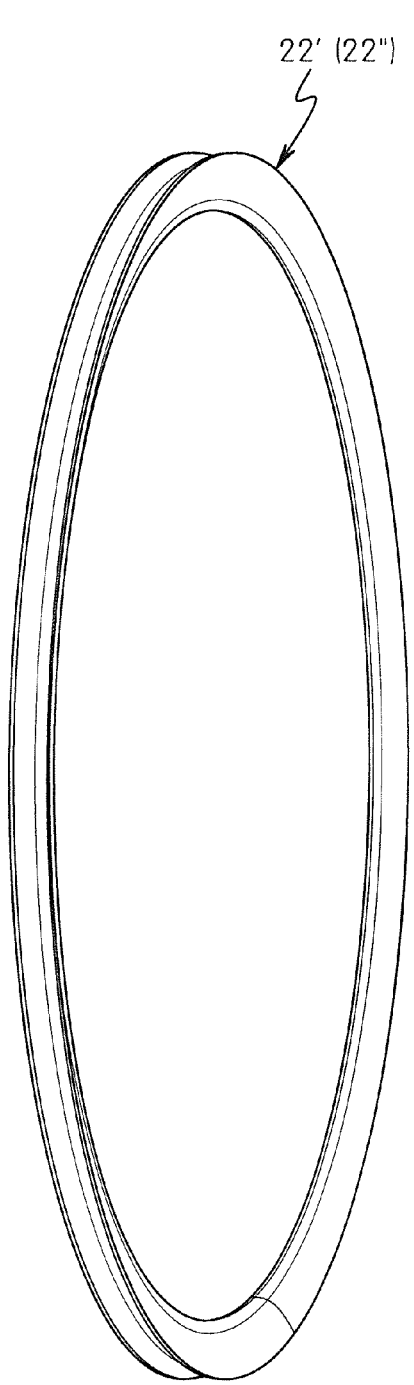
FIG. 21 is a perspective view of the inner rim portion that was manufactured using either the second or third manufacturing processes.
Figure 22:
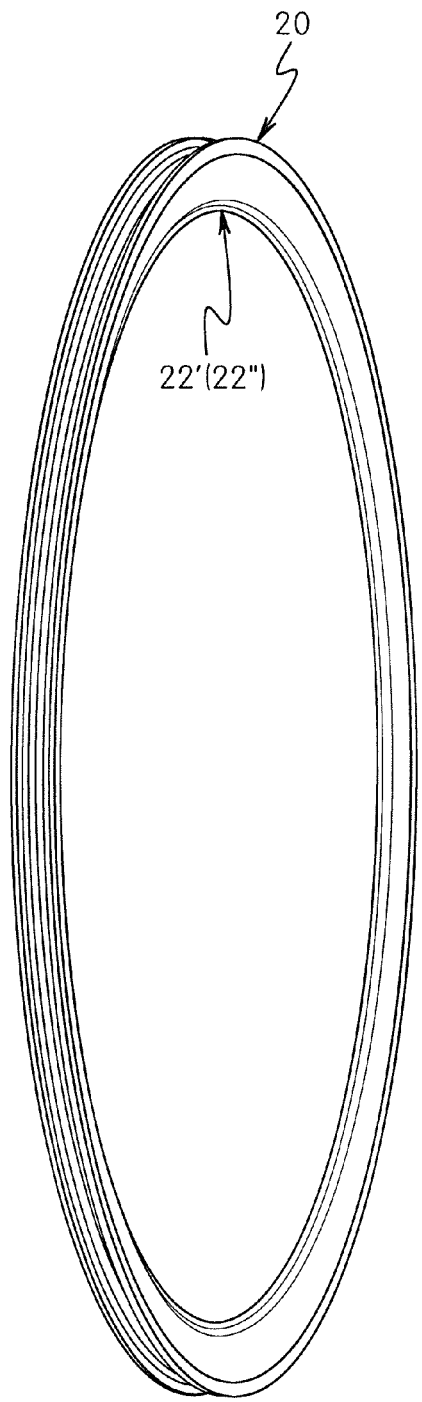
FIG. 22 is a perspective view of the rim after joining the outer rim portion to the inner rim portion, which was manufactured using anyone of the first to third manufacturing processes.
Figure 23:
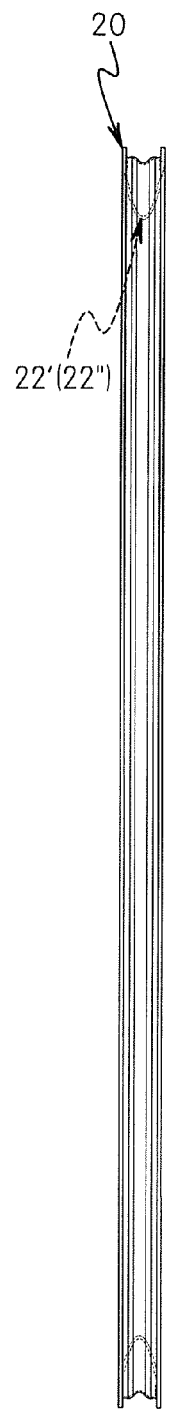
FIG. 23 is an edge elevational view of the rim illustrated in FIG. 22 after the outer rim portion to the inner rim portion.

As seen in FIG. 15, after the plate 62 is cut, the plate 62 is rounded to form a hoop or cylindrical ring 64. Now, the circumferential ends 64a and 64b of the cylindrical ring 64 are joined together by a welding operation to form a joint 66 such that the cylindrical ring 64 is a continuous cylindrical ring as seen in FIG. 17. A grinding operation is performed on the joint 66 if the circumferential ends 64a and 64b of the cylindrical ring 64 are joined together by a welding operation. Then, as seen in FIG. 18, the cylindrical ring 64 is deformed using the opposed rollers 58 and 60 in the same manner as the first manufacturing process for manufacturing the inner rim portion 22. Thus, in the second manufacturing process, the forming of the inner rim portion 22' includes rounding the plate 62 that constitutes the second material, and subsequently coupling circumferential free ends 64a and 64b of the cylindrical ring 64 (i.e., the plate 62 after being rounded) together to form a cylindrical ring prior to performing the spinning operation to form the arch shaped cross sectional profile. As a result, as shown in FIG. 21, the inner rim portion 22' is the same overall shape as the inner rim portion 22.

Figure 19:
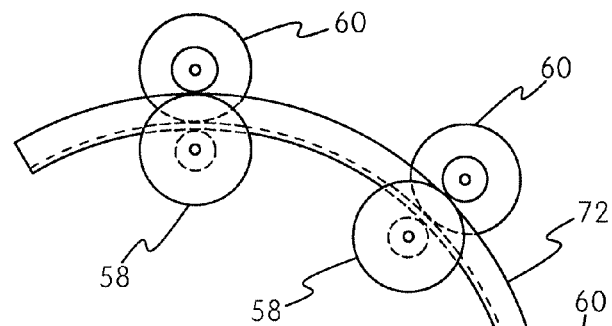
FIG. 19 is a diagrammatic view of the plate illustrated in FIG. 14 being rounded to form a hoop or cylindrical ring while also simultaneously forming an arch shaped cross sectional profile by spinning the plate using a plurality of opposed rollers for manufacturing the inner rim portion in accordance with a third manufacturing process.
Figure 19:
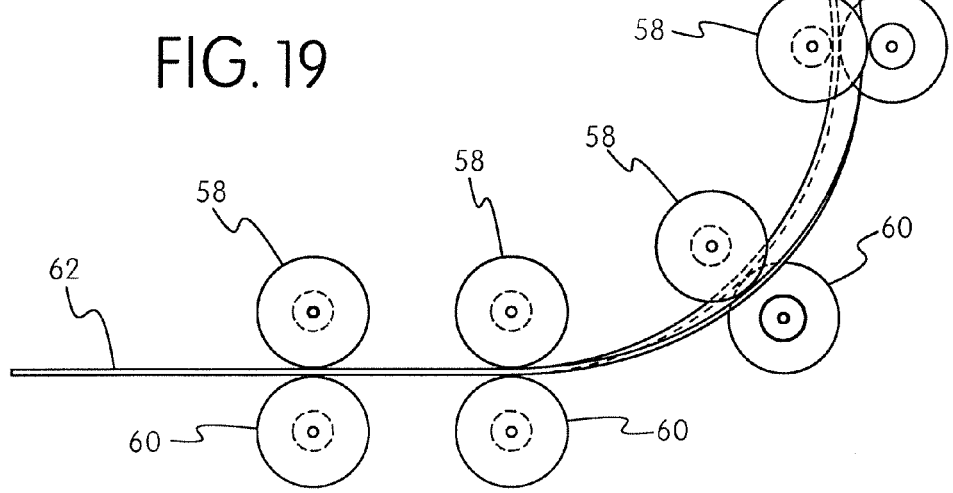
Figure 20:
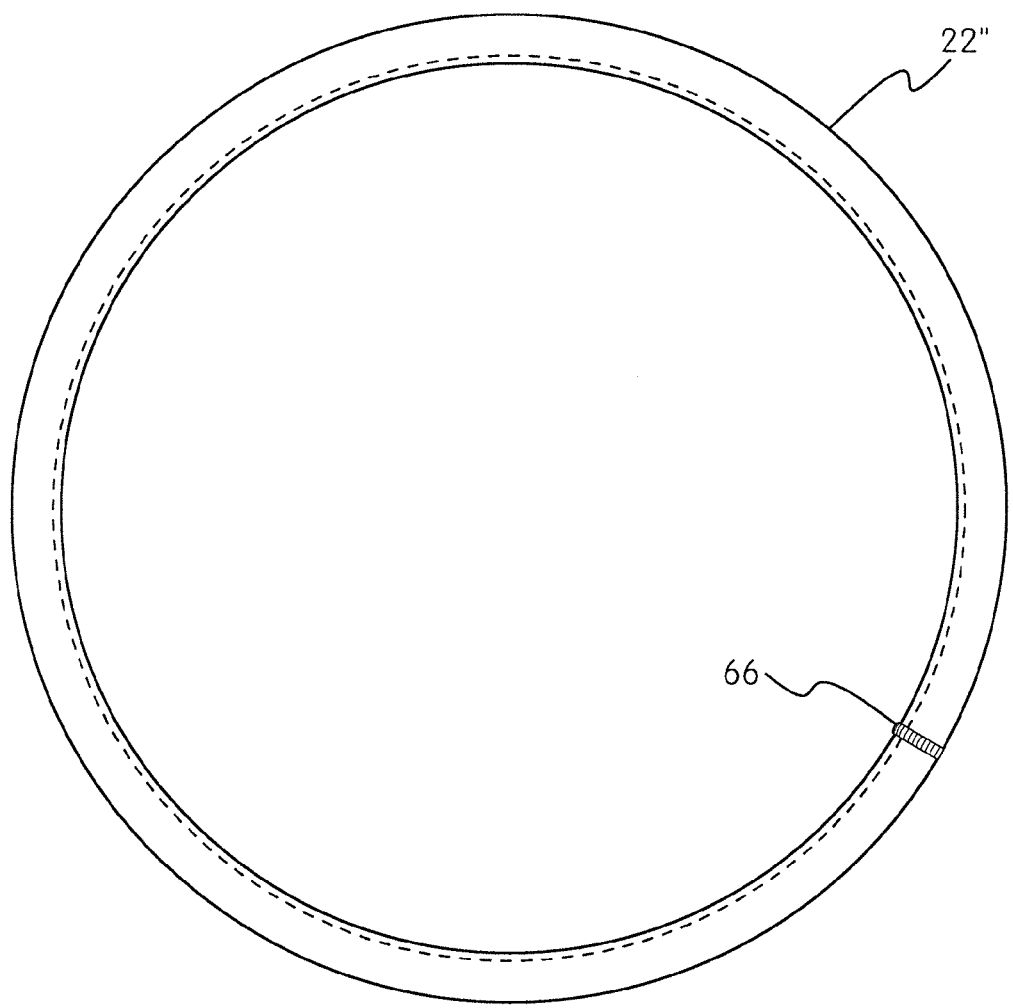
FIG. 20 is a diagrammatic perspective view of the inner rim portion that was formed in FIG. 19, after the first and second circumferential ends of the inner rim portion together have been weld together in accordance with the third manufacturing process.

Referring now to FIGS. 19 and 20, a third process of manufacturing an inner rim portion 22" of the rim 14 for the bicycle wheel 10 of FIG. 1 will now be discussed. Basically, the in this third process of manufacturing the inner rim portion 22", the starting material (i.e., the plate 62) is the same in the second manufacturing process and the end result is the same in the second manufacturing process. Thus, the inner rim portions 22' and 22" are the as shown in FIG. 21, but manufactured differently. In particular, as seen in FIG. 19, this third manufacturing process uses the plate 62 shown in FIG. 14 as the second material for the inner rim portion 22". As also seen in FIG. 19, the plate 62 is rounded to form a hoop or cylindrical ring 72 while also simultaneously forming an arch shaped cross sectional profile by spinning the plate 62 using the opposed rollers 58 and 60. The rollers 58 and 60 are gradually moved towards each other while spinning the cylindrical ring 72 to form the inner rim portion 22" with the arch shaped cross sectional profile as seen in FIG. 18 in the same manner as the first process of manufacturing the inner rim portion 22. Now, the circumferential ends of the inner rim portion 22" are joined together by a weld joint 66 as seen in FIG. 20.

Thus, in the third manufacturing process, the forming of the inner rim portion 22" includes rounding the plate 62 that constitutes the second material, while also simultaneously performing the spinning operation to form the arch shaped cross sectional profile and then subsequently coupling circumferential free ends 64a and 64b of the cylindrical ring 64 (i.e., the plate 62 after being rounded) together to form a cylindrical ring prior to performing the spinning operation. As a result, as shown in FIG. 21, the inner rim portion 22" is a continuous cylindrical ring with the same overall shape as the inner rim portion 22' circumferential free ends 64a and 64b In each of the above mentioned processes of manufacturing the inner rim portion 22, 22' or 22", the material that is used as a base or starting material for the inner rim portion 22, 22' or 22" is subjected to metal deformation by spinning which causes a structural change in the base or starting material. In other words, in materials science, deformation such as spinning is a permanent change in the shape and/or size of an object due to an applied force. As deformation occurs due to spinning, internal inter-molecular forces arise that oppose the applied force so that the base or starting material is deformed without cracking and an arch shaped cross sectional profile with a high aspect ratio can be attained after the outer and inner rim portions 20 and 22 are joined together.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "circumferential", "radial", "axial", "width", "inner", "outer", and "transverse" as well as any other similar directional terms refer to those directions with respect to a center axis of rotation of the bicycle rim. The term "hoop" as used herein is not limited to a closed ring, but rather generically refers to both closed rings and split rings. Finally, terms of degree such as "substantially", "about" and "approximately" as used herein mean a reasonable amount of deviation of the modified term such that the end result is not significantly changed, e.g., manufacturing tolerances.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method of manufacturing a bicycle rim comprising:
    forming an outer rim portion having a ring shape from a first material;
    forming an inner rim portion having a cylindrical ring shape from a plate of a second material by rounding the plate of the second material while also simultaneously spinning the plate, and subsequently coupling circumferential ends of the plate together to form the cylindrical ring; and
    joining the outer and inner rim portions together to form the bicycle rim.

2. The method of manufacturing according to claim 1, wherein
    the inner rim portion further having an arch shaped cross sectional profile.

3. The method of manufacturing according to claim 1, wherein
    the forming of the outer rim portion includes extruding and subsequently rounding the first material.

4. The method of manufacturing according to claim 1, wherein
    the spinning of the inner rim portion includes using at least a roller.

5. The method of manufacturing according to claim 1, wherein
    the spinning of the inner rim portion includes using at least two opposed rollers.

* * * * *